United States Patent [19]

Reynolds

[11] 4,235,299
[45] Nov. 25, 1980

[54] GEAR SHIFT CONNECTING APPARATUS

[75] Inventor: Roy Reynolds, Waukesha, Wis.

[73] Assignee: Applied Power Inc., Milwaukee, Wis.

[21] Appl. No.: 931,994

[22] Filed: Aug. 8, 1978

[51] Int. Cl.³ .............................................. B62D 27/06
[52] U.S. Cl. ............................. 180/328; 74/473 P; 180/89.15; 296/190
[58] Field of Search ............. 180/77 TC, 89.14, 89.15, 180/89.16; 296/28 C, 190; 292/144, DIG. 25; 74/473 P; 403/316, 317, 322; 287/DIG. 5, 31

[56] References Cited

U.S. PATENT DOCUMENTS

| | | | |
|---|---|---|---|
| 1,876,709 | 9/1932 | MacPherson | 74/473 P |
| 3,051,259 | 8/1962 | Lorenz | 180/89.16 |
| 3,329,229 | 7/1967 | Mukho | 180/77 TC |
| 3,617,081 | 11/1971 | Drucker | 287/DIG. 5 X |
| 3,667,566 | 6/1972 | Hopkins | 296/28 C X |
| 3,761,123 | 9/1973 | Neill et al. | 296/28 C |
| 4,082,342 | 4/1978 | Ailshie et al. | 296/28 C |

Primary Examiner—John J. Love
Assistant Examiner—Michael Mar
Attorney, Agent, or Firm—John J. Byrus; Edward E. Dyson

[57] ABSTRACT

A gear shift connecting apparatus of the type operable to latch and release a gear shift rod of a tiltable tractor cab to a chassis portion of the tractor. The gear shift connecting apparatus includes a housing operably connected to the tractor chassis and a connection member fashioned on the lowermost portion of the gear shift rod. A hydraulically actuated connecting/release assembly is mounted within the housing and includes a cylindrical cup operable to receive the connection portion of the gear shift rod. In a connection mode spherical locking members carried by a cylindrical sleeve radially engage a connection portion of the gear shift rod. A locking/disabling sleeve is telescopically mounted about the cylindrical sleeve and is biased in a posture to retain the spherical locking members in contact with the gear shift rod. In a release mode a hydraulic chamber is actuated which slides the locking/disabling sleeve out of backup contact with the spherical locking members. The locking members are then cammed out of engagement with the gear shift rod to permit the gear shift rod to be separated from the housing and tractor chassis.

7 Claims, 4 Drawing Figures

GEAR SHIFT CONNECTING APPARATUS

BACKGROUND OF THE INVENTION

This invention relates to a connection assembly. More specifically this invention relates to a gear shift connection apparatus for a tiltable, over-the-engine, tractor cab.

In the trucking industry the tractor portion of a tractor trailer combination is often designed with the cab mounted on top of the tractor engine and transmission. Such a design, among other things, minimizes the overall length of the rig and is in widespread and popular use.

In order to service and/or work on the engine of such a tractor design the cab is tilted upward to expose the engine and drive train. At least one illustration of such a unit may be found by reference to U.S. Pat. No. 3,761,123 to Neill et al and of common assignment with the subject application. In this patented design a hydraulic cylinder is utilized to tilt the cab from a normal horizontal position to a tilted posture as depicted in FIG. 1 of the patent.

In order to lock the cab in a normally lowered operating position the present applicant has invented a noval hydraulic coupling which forms the subject matter of a copending application Ser. No. 696,591 entitled LATCHING MECHANISM now U.S. Pat. No. 4,082,342.

A significant problem with tractors having an over-the-engine cab design is that the gear shift rod which is connected to the gear box, must also project into the cab adjacent an operators station. When the tractor cab is tilted upwardly for service some provision must be made to accommodate the gear shift rod.

One solution to the gear shift problem entails providing a slot in the cab floor so that the shift rod will pass through the slot when the cab is tilted forward. Leather or rubber sealing strips are fitted along each side of the slot to reduce engine noise and prevent dust and cold air from blowing into the cab. These strips, however, are considered only marginally effective in a new condition and in a worn or used condition typically do not function in an acceptable manner.

Another previously know design provides a mechanical telescopic coupling between a gear shift rod and a gear box. When the cab is tilted forward the connection telescopes outwardly. At least one difficulty with such a design is that it is somewhat mechanically complicated, expensive to initially install and maintain and subject to fouling and jamming.

The difficulties suggested in the preceeding are not intended to be exhaustive, but rather are among many which may tend to reduce the effectiveness of prior designs for accommodating a gear shift rod in an over-the-engine cab. Other noteworthy problems may also exist; however, those presented above should be sufficient to demonstrate that designs appearing in the past will admit to worthwhile improvement.

It would be desirable to provide a connection assembly wherein the gear shift rod could be reliably released from connection to the tractor chassis when the cab is tilted forward and reconnected to the chassis when the cab is lowered again. Additionally it would be highly desirable to provide a connection system which is automatic in operation and does not require special operator attention or consideration.

OBJECTS OF THE INVENTION

Accordingly it is a general object of the invention to provide a novel gear shift connection apparatus which will obviate and/or minimize problems of the type previously described.

It is a particular object of the invention to provide a novel gear shift connection apparatus which will enable a gear shift rod to be released from connection to a tractor chassis as the tractor cab is tilted forward.

It is another object of the invention to provide a novel gear shift connection apparatus which will provide automatic release and reconnection as a tractor cab is raised and lowered respectively.

It is still another object of the invention to provide a novel gear shift connection apparatus which is operable to lock the gear shift to the tractor chassis when the tractor cab is in a lowered normal position.

It is a further object of the invention to provide a novel gear shift connection apparatus which will be enclosed and relatively service free.

It is yet a further object of the invention to provide a novel gear shift connection apparatus which will be substantially free from jamming.

It is yet still a further object of the invention to provide a novel gear shift connection apparatus which is relatively inexpensive to install and may be fitted to existing equipment.

BRIEF SUMMARY OF THE INVENTION

A gear shift connection apparatus intended to accomplish at least some of the foregoing objects includes a cup shaped housing operably mounted upon a tractor chassis. A connection member is formed at the lowermost end of the gear shift rod and includes a conical mating tip and lateral recesses to receive a locking member.

A hydraulically actuated connecting/release assembly is mounted within the housing and includes a cylindrical cup operable to receive the connection portion of the gear shift rod, in one mode spherical locking members carried by a cylindrical sleeve radially engage a connection portion of the gear shift rod and a locking-/disabling sleeve is telescopically mounted about the cylindrical sleeve and biased in a posture to retain the spherical locking members in contact with the gear shift rod. In a release mode a hydraulic chamber is actuated and the locking/disabling sleeve slides out of backup contact with the spherical locking members. The locking members are then cammed out of engagement with the gear shift rod to permit the gear shift rod to be separated from the housing and tractor chassis.

THE DRAWINGS

Other objects and advantages of the invention will become apparent from the following detailed description taken in conjunction with the accompanying drawings wherein.

DETAILED DESCRIPTION

Figure 1:
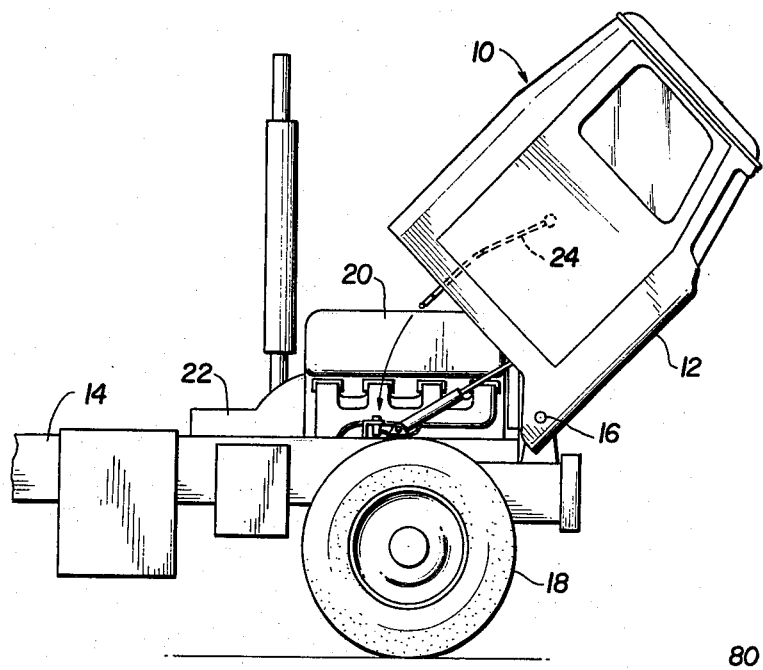
FIG. 1 is a side view of a tractor having a tiltable cab which comprises the operative environment of the subject invention.

Referring now to the drawings wherein like numerals indicated like parts and particularly FIG. 1 thereof there will be seen a cab-over-the-engine type of tractor 10 which comprises the operative environment of the subject invention.

The tractor cab 12 is pivotally connected to a forward portion of the tractor chassis 14 as at 16. The tractor chassis is supported above the ground by conventional axle and wheel assemblies 18. The chassis carries the tractor engine 20 and drive train 22.

The tractor cab 12 has a gear shift rod 24 mounted through a closed ball joint connection in the cab floor (not shown) and projects beneath the cab for connection with a conventional gear box assembly (also not shown) and finally the vehicle chassis 14.

Figure 2:
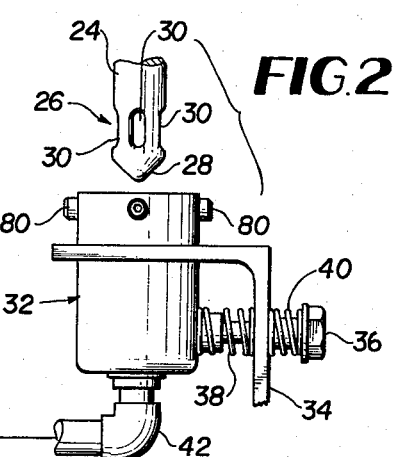
FIG. 2 is a side view of a gear shift connection apparatus forming the subject matter if the instant invention with a schematic hydraulic actuation system connected thereto.

Referring now to FIG. 2 it will be seen that the gear shift rod 24 terminates with a connection means 26 comprising an extension having a conical mating tip 28 and elongate lateral connection recesses 30.

A cylindrical cup shaped housing 32 is resiliently connected to a mounting bracket 34 through the provision of an axial bolt 36 and double compression spring arrangement 38 and 40.

A hydraulic line 42 connections into the base of the housing 32 for reasons which will become apparent hereinafter and is tied via a tee 44 directly into a power line 46 of a hydraulic cylinder cab tilting circuit 48.

Such a hydraulic tilting circuit is described in detail in the previously identified Neill et al patent but briefly includes a power line 46 going to a raising side of a hydraulic piston and cylinder combination (not shown) and a return line 49 returning from a downstream side of the cylinder.

The raising or power line 46 is delivered pressurized hydraulic working fluid from a sump 50 via a pump 52. A parallel/crossing path reversing valve 54 is interposed between the pump 52 and hydraulic cylinder (not shown) and serves in a parallel mode to deliver working fluid directly to a raising side of the cylinder via line 46 and to said housing 32 of the subject invention via tee 44 and line 42.

The hydraulic fluid return line 48 feed through a resistor 60 and back to the sump 50 to controllably cycle fluid out of the cab tilting cylinder.

Actuation of the lever 62 and valve 54 into a crossing posture delivers lowering fluid to the high side of the lifting cylinder to induce lowering of the tractor cab 12. Concomitantly fluid drains from the lines 46 and 42 slowly through the resistance 60 as the cab lowers back into a normal horizontal posture and as the gear shift connection means 26 enters the chassis mounted housing 32.

Figure 3:
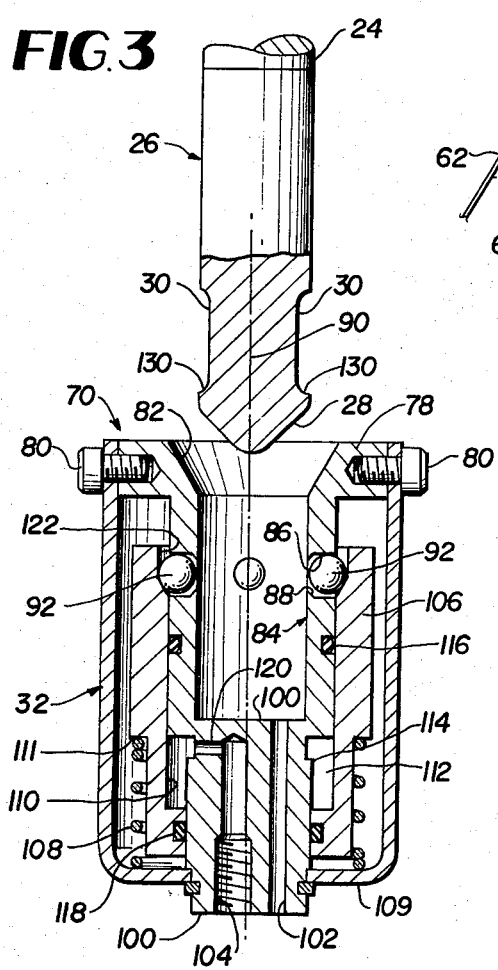
FIG. 3 is a cross-sectional detail view of the subject gear shift connection apparatus in a connection/release posture.
Figure 4:
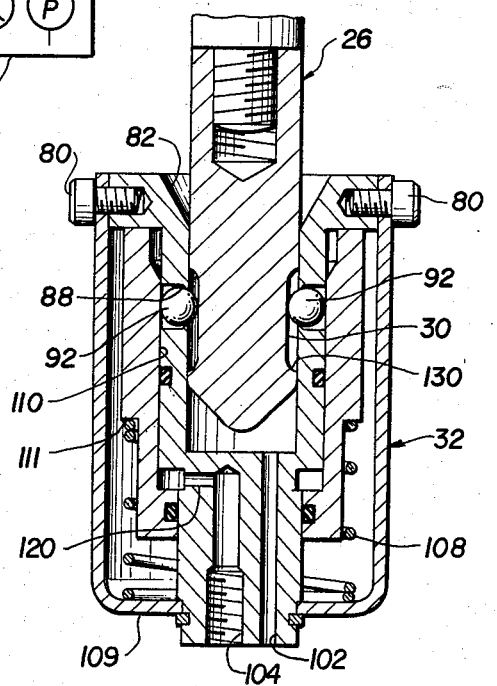
FIG. 4 is a cross-sectional detail view of the gear shift connection in a coupled position.

Referring now particularly to FIGS. 3 and 4 there will be seen detail cross-sectional views of the subject gear shift connection apparatus.

More specifically the apparatus 70 includes a cup shaped housing 32 which is preferably mounted upon the tractor chassis, a connection means 26 and a latching/release means 76 mounted within the housing 32.

As previously noted the connection means 26 includes a conical nose or tip 28 and a plurality of axially extending grooves or recesses 30. The connection member 26 moves with the over-the-engine tractor cab 12 into and out of engagement with a connecting/release means 76 mounted with the housing 32.

The connecting/release means 76 includes a generally cup shaped, cylindrical sleeve member 78 which is connected to the brim of the cup 32 by a plurality of radially directed machine bolts 80. The sleeve member 78 includes an open mouth portion 82 adapted to receive and guide the tip 28 of the connection member 26 into a sleeve portion 84 of the cup 78.

The sleeve portion 84 is fashioned with a plurality of radially extending ports 86 having inwardly tapered openings 88 looking into the interior of the sleeve 84 toward a central longitudinal axis thereof 90.

The radial ports 86 each operably carry a spherical locking member 92 having a diameter less than the diameter of the ports 86 but greater than the diameter of openings 88. Accordingly the spherical locking members 92 are free to radially translate within the ports 86 and at least partially project into the cylinder 84 but will not fall into the cylinder due to the limitation provided by the diameter of openings 88.

A base 100 is formed at the bottom of the sleeve 84 and includes a first axial bore or aperture 102 which is open to the ambient environment. Stray fluid or dust which may tend to accumulate within the cup 78 is thus permitted to vent to the atmosphere. The base 100 further includes a second axial bore 104 which is connected directly to hydraulic line 42 to operably direct pressurized fluid into the housing 32 to release the connection member 26 from the connection/release means 76 in a manner which will be discussed more fully below.

The connecting/release means 76 further includes a locking/disabling sleeve 106 which telescopes with respect to the cylindrical sleeve portion 84 of the cup shaped member 78.

The locking/disabling sleeve 106 is biased by a compression spring 108 which extends between a base portion 109 of the housing 32 and a ledge 111 of the telescoping sleeve 106. The spring 108 biases the sleeve 106 into a locking posture, note FIG. 4, wherein an inner cylindrical surface 110 of the sleeve 106 is axially positioned adjacent the radially movable locking spheres 92. In this position the locking spheres 92 project through the openings 88 and into engagement with the recesses 30 formed within the connection member 26. Accordingly the connection member 26 is locked within the housing 32.

An annular hydraulic chamber 112 is formed between an inner cylindrical surface 110 of the telescoping sleeve 106 and an outer cylindrical surface 114 of the base portion 100 of the cup shaped member 78. Upper and lower annular seals 116 and 118 serve to fluidically isolate the annular hydraulic chamber 112 from the interior of the housing 32. A radial port 120 extends between the bore 104 and the annular chamber 112 and serves to convey pressurized fluid into and away from the chamber 112.

An annular recessed rim 122 is formed at the upper end of the locking/disabling sleeve 106. When the annular rim is brought into axial juxtaposition with respect to the spherical locking members 92 withdrawal force on the connection member 26 will bring camming surfaces 130 into contact with the locking spheres and cam the spheres outwardly into the upper annular rim 122. When cylindrical surface 110 of the telescoping sleeve 106 is brought into axial juxtaposition with respect of the spherical locking member 92 by upward force of spring 108 any attempted withdrawal of the connection member 26 will bring camming surface 130 into contact with the locking spheres and prevent spheres 92 from moving outwardly into upper annular rim 122.

In operation the gear shift connecting apparatus 5 would be in a locked posture such as depicted in FIG. 4. When it was desired to work on and/or service the tractor engine an operator sets the valve in the parallel posture depicted in FIG. 2 and actuates the hydraulic pump 52. Pressurized hydraulic fluid is then pumped into a cab lifting cylinder (not shown) and into the annular chamber 112 via tee 44, line 42, bore 104 and radial feed 120.

The telescoping sleeve 106 will be translated against biasing spring 108 to a position depicted in FIG. 3. As the cab is tilted forward the camming surfaces 130 of the connection member 26 will push the locking spheres 92 into a disabled posture within the annular recess 122. The connection member 26 is then free to move out of the housing with the tractor cab.

When the repair or servicing work is completed and the operator pulls the valve 48 into a crossing mode. Hydraulic fluid from the raised cylinder and annular chamber 112 is then vented through a restrictor 60 back to the sump 50.

The restrictor will maintain a back pressure on the hydraulic fluid as the cab is lowered and will accordingly maintain the sleeve 106 in a disabled posture. Once the cab is completely lowered and the connection member 26 is again positioned within the housing 32 the pressure within line 46 and 42 will be bled down sufficiently such that the spring 108 will be sufficient to overcome the hydraulic fluid in the annular chamber 112 and telescope the sleeve back into a locking position as depicted in FIG. 4.

In describing the invention, reference has been made to a preferred embodiment of the invention, those skilled in the art will recognize several advantages which are expressly and/or inherently disclosed.

In brief summary, however, a particularly significant aspect of the instant invention is the provision of a gear shift connection member and a connecting/release means which permits the gear shift to be disconnected from the tractor chassis when an over-the-engine cab is tilted upwardly. Additionally in this vein the subject gear shift connecting apparatus provides an automate release and reconnection as the tractor cab is tilted without requiring special operator attention.

The instant invention provides a secure lock for the gear shift when the cab is in a lowered position and also permits a degree of resiliency at the connection to accommodate force transmissions.

Additionally the subject connection apparatus is self enclosed and is free from most jamming difficulties while requiring little service attention.

Still further the gear shift connecting apparatus may be compatably fitted with existing equipment and is relatively inexpensive to install.

In describing the invention reference has been made to a preferred embodiment. Those skilled in the art, however, and familiar with the disclosure of the subject invention, may recognize additions, deletions, modifications, substitutions and/or other changes which will fall within the purview of the invention as defined in the following claims.

What is claimed is:

1. A gear shift connecting apparatus of the type operable to latch/release a gear shift rod of a tiltable tractor cab to a chassis portion of the tractor, said gear shift connecting apparatus comprises:

housing means operably mounted upon one of the gear shift rod of the tiltable tractor cab and the tractor chassis;

connection means operably mounted upon the other of the gear shift rod and the tractor chassis; and hydraulically actuated connecting/release means mounted within said housing means for connecting the gear shift rod to the tractor chassis when the tractor cab is in a normal lowered position and releasing the gear shift rod from the tractor chassis when the tractor cab is raised in a tilted posture, said connecting/release means including, a cylindrical sleeve means mounted within the interior of said housing means for operably receiving said connection means, locking means carried within apertures fashioned radially through said cylindrical sleeve means for selectively engaging or releasing said connection means, a locking/disabling sleeve telescopically surrounding said cylindrical sleeve means for operably retaining said locking means in an actuated position or permitting said locking means to become disabled and release from engagement with said connection means, means for biasing said locking/disabling sleeve in a locking position, an upper annular recess in the inner rim portion of said locking/disabling sleeve for permitting said locking means carried within said apertures to travel radially away from the central axis of said cylindrical sleeve means and out of engagement with said connecting means when said annular recess is axially brought into juxtaposition with said locking means, and annular hydraulic chamber means between said cylindrical sleeve means and said locking/disabling sleeve for axially telescoping said locking/disabling sleeve with respect to said cylindrical sleeve means to selectively bring said annular recess into axial juxtaposition with said locking means and for permitting release of said locking means.

2. A gear shift connecting apparatus as defined in claim 1 wherein said means for biasing comprises:

spring means connected to said locking/disabling sleeve for normally biasing said locking/disabling sleeve in an axial telescoping posture with respect to said cylindrical sleeve means so as to lock said locking means carried within apertures in said cylindrical sleeve means in radial engagement with said connection means.

3. A gear shift connecting apparatus as defined in claim 2 wherein said locking means carried within said apertures comprises:

spherical call means which may be operably carried into and out of locking engagement with said connection means.

4. A gear shift connecting apparatus as defined in claim 1 wherein:

said housing means is operably mounted upon the tractor chassis; and said connection means is fashioned at a lowermost end of the gear shift rod.

5. A gear shift connecting apparatus as defined in claim 4 wherein said cylindrical sleeve means comprises:
 a generally cylindrical cup mounted within the interior of said housing means for operably receiving said connection means; and
 an aperture fashioned through the base of said cylindrical cup and said housing means for venting fluid inadvertently collected within said cylindrical cup.

6. A gear shift connecting apparatus as defined in claim 4 wherein: said housing means is resiliently mounted upon the tractor chassis to permit a degree of motion relative to the tractor chassis.

7. A gear shift connecting apparatus as defined in claim 1 wherein said locking means comprises: spherical ball means carried within apertures fashioned radially through said cylindrical sleeve for radial movement toward and away from a central axis of said cylindrical sleeve and into and out of locking engagement with recesses fashioned within said connection means.

* * * * *